US009434330B2

(12) United States Patent
Lee (10) Patent No.: US 9,434,330 B2
(45) Date of Patent: Sep. 6, 2016

(54) METHOD FOR CONTROLLING VEHICLE DRIVING

(71) Applicant: HANWHA TECHWIN CO., LTD., Changwon-Si (KR)

(72) Inventor: Seong Jun Lee, Changwon-si (KR)

(73) Assignee: Hanwha Techwin Co., Ltd., Changwon-si (KR)

( * ) Notice: Subject to any disclaimer, the term of this patent is extended or adjusted under 35 U.S.C. 154(b) by 72 days.

(21) Appl. No.: 14/266,088

(22) Filed: Apr. 30, 2014

(65) Prior Publication Data

US 2015/0120129 A1 Apr. 30, 2015

(30) Foreign Application Priority Data

Oct. 24, 2013 (KR) .......................... 10-2013-0127297

(51) Int. Cl.
| | |
|---|---|
| B60R 16/023 | (2006.01) |
| B60L 1/00 | (2006.01) |
| B60L 3/00 | (2006.01) |
| B60L 3/12 | (2006.01) |
| B60L 11/12 | (2006.01) |
| B60L 15/20 | (2006.01) |

(52) U.S. Cl.
CPC ............ *B60R 16/0231* (2013.01); *B60L 1/003* (2013.01); *B60L 1/006* (2013.01); *B60L 3/0046* (2013.01); *B60L 3/0084* (2013.01); *B60L 3/12* (2013.01); *B60L 11/123* (2013.01); *B60L 15/20* (2013.01); *B60L 2210/10* (2013.01); *B60L 2210/30* (2013.01); *B60L 2210/40* (2013.01); *B60L 2240/12* (2013.01); *B60L 2240/24* (2013.01); *B60L 2240/421* (2013.01); *B60L 2240/423* (2013.01); *B60L 2240/545* (2013.01); *B60L 2240/547* (2013.01); *B60L 2240/549* (2013.01); *B60L 2250/10* (2013.01); *Y02T 10/7005* (2013.01); *Y02T 10/7077* (2013.01)

(58) Field of Classification Search
CPC .... B60R 16/0231; B60L 11/00; B60L 1/003; B60L 1/006; B60L 3/0046; B60L 3/0084; B60L 3/12; B60L 11/123; B60L 15/20
USPC ........................................................ 701/29.1
See application file for complete search history.

(56) References Cited

U.S. PATENT DOCUMENTS

| | | | |
|---|---|---|---|
| 2004/0064539 A1* | 4/2004 | Itoi | H04L 41/08 709/223 |
| 2005/0141565 A1* | 6/2005 | Forest | H04J 3/0652 370/503 |

FOREIGN PATENT DOCUMENTS

| | | |
|---|---|---|
| JP | 4124208 B2 | 7/2008 |
| JP | 2012-165524 A | 8/2012 |
| JP | 2013-9047 A | 1/2013 |
| KR | 10-0764220 B1 | 10/2007 |
| KR | 10-2012-0126852 A | 11/2012 |

* cited by examiner

*Primary Examiner* — Aaron L Troost
(74) *Attorney, Agent, or Firm* — Sughrue Mion, PLLC (57) ABSTRACT

A method for controlling vehicle driving is provided. The method for controlling vehicle driving enables stable continuation of driving or stable stopping even when a communication fault occurs. The method for controlling vehicle driving includes: determining whether a fault has occurred in a first network between a master controller and a first slave controller; and if it is determined that a fault has occurred in the first network between the master controller and the first slave controller, controlling the master controller to transmit information, which is directed to the first slave controller, a second slave controller through the first network between the master controller and the second slave controller, and controlling the second slave controller to transmit the information received from the master controller to the first slave controller through a second network.

18 Claims, 7 Drawing Sheets

METHOD FOR CONTROLLING VEHICLE DRIVING

CROSS-REFERENCE TO RELATED APPLICATION

This application claims priority from Korean Patent Application No. 10-2013-0127297, filed on Oct. 24, 2013, in the Korean Intellectual Property Office, the disclosure of which is incorporated herein by reference in its entirety.

BACKGROUND

1. Field

Methods and systems consistent with exemplary embodiments relate to controlling vehicle driving, and more particularly, to controlling vehicle driving which enables stable continuation of driving or stable stopping even when a communication fault occurs.

2. Description of the Related Art

The world automobile industry has been repeating rapid growths, revolving around gasoline and diesel internal combustion engines, for more than last hundred years. However, the industry is facing a great challenge because of increasing environmental regulations and energy security threats arising from fossil fuel exhaustion.

Accordingly, countries around the world have continued to participate, one after another, in the fierce competition for development of eco-friendly automobiles, and each automobile manufacturer is making diligent efforts in order not to fall behind in the technology development competitions for future automobile requiring eco-friendliness and high efficiency in addition to advanced technologies.

In particular, in response to meet the demands of requiring more eco-friendly products with solving the pending fossil fuel exhaustion issue, each automobile manufacturer has been recently performing researches on electric cars using electric motors as power sources more intensely.

The research fields which are most actively performed now may include electric cars such as hybrid vehicles and fuel cell vehicles.

In a broad sense, the hybrid vehicles are those driven by efficiently combining two or more of different power sources. In most cases, however, the hybrid vehicle is a vehicle having driving forces from engines using fuel, such as gasoline or diesel, and electric motors operating on power from high voltage batteries. This is called as a hybrid electric vehicle (HEV).

The hybrid electric vehicle uses optimum operation areas of engines and electric motors and thus the fuel efficiency of the whole driving system is improved. In addition, energy is collected through an electric motor to charge high voltage batteries, enabling efficient energy use.

Meanwhile, a fuel cell is a device which directly converts chemical energy of fuel into electrical energy, electrochemically, without converting into heat by combustion. The fuel cell is a pollution-free generator of which research has been performed with interest recently.

In a vehicle provided with a fuel cell, hydrogen used as fuel is provided as a fuel cell to generate electricity, and electricity generated from the fuel cell operates an electric motor to drive the vehicle.

Meanwhile, in a fuel cell vehicle (or a fuel cell battery hybrid vehicle), a vehicle control unit (hereinafter referred to as "VCU") is provided and each device or component constituting the vehicle system (i.e. engine, battery, motor, etc.) is provided with a separate controller.

Thus, in a fuel cell vehicle, each device or component is provided with a controller and when the vehicle is driven, cooperative control in which a plurality of controllers operate with the VCU as an upper-level controller is performed. In this case, controllers of each device communicate information with one another and the upper-level controller, VCU, transfers commands to lower-level controllers.

However, when there is a vehicle accident or other malfunctions such as a short circuit of major high voltage power supply lines occur, and thus the ground voltage of the vehicle becomes unstable, communication states between various major controllers may become unstable. In this case, an emergency situation in which the major controllers of the vehicle become out of control occurs and the vehicle cannot be driven safely any longer.

SUMMARY

One or more exemplary embodiments provide a method for controlling vehicle driving enabling continuation of stable driving of a vehicle even when a communication fault/failure between controllers occurs.

One or more exemplary embodiments provide a method for controlling vehicle driving in which when a communication fault/failure between controllers occurs, a vehicle may be stably stopped and power supply is shut off.

According to an aspect of an exemplary embodiment, there is provided a method for controlling vehicle driving which may include: determining whether a fault has occurred in a first network between a master controller and a first slave controller; and if it is determined that a fault has occurred in the first network between the master controller and the first slave controller, controlling the master controller to transmit information, which is directed to the first slave controller, a second slave controller through the first network between the master controller and the second slave controller, and controlling the second slave controller to transmit the information received from the master controller to the first slave controller through a second network.

The method may further include if it is determined that the fault has occurred in the first network between the master controller and the first slave controller, controlling the first slave controller to transmit information, which is directed to the master controller, to the second slave controller through the second network and controlling the second slave controller to transmit the information received from the first slave controller to the master controller through the first network between the second slave controller and the master controller.

The master controller may be configured to transmit information to and receive information from each of the slave controllers through the first network.

Each of the slave controllers may be configured to transmit information to and receive information from another slave controller of the slave controllers through the second network.

The first slave controller may be configured to provide power according to a control from the master controller, and
  wherein the method further comprises:
  if it is determined that a fault has occurred in the first network between the master controller and the first slave controller, controlling the first slave controller to switch to a power supply mode and provide the power to the second slave controller regardless of the control of the master controller.

The method may further include outputting a warning signal indicating that a fault has occurred in the first network if it is determined that a fault has occurred in the first network between the master controller and the first slave controller.

The method may further include if it is determined that a fault has occurred in the first network between the master controller and the first slave controller, determining whether the fault has been removed in the first network between the master controller and the first slave controller; and if it is determined that the fault has been removed in the first network between the master controller and the first slave controller, controlling the master controller to transmit information to and receive information from the first slave controller through the first network.

If the first slave controller does not receive information that is transmitted from the master controller, it is determined that the fault has occurred in the first network.

The method may further include if it is determined that a fault has occurred in the first network between the master controller and the first slave controller, determining whether a fault has occurred in the second network between the second slave controller and the first slave controller; and if it is determined that a fault has occurred in the second network between the second slave controller and the first slave controller, controlling the third slave controller to receive the information from the master controller and transmit the information received from the master controller to the first slave controller through the second network between the third slave controller and the first slave controller.

The first slave controller may be configured to provide power according to a control from the master controller, and the third slave controller is configured to control a motor of the vehicle, and wherein the method may further include: controlling the first slave controller to transmit information to stop acceleration of the vehicle, to the third slave controller through the second network between the first slave controller and the third slave controller.

The first slave controller may be configured to provide power according to a control from the master controller, and the third slave controller is configured to control a motor of the vehicle, and wherein the method may further include: controlling the first slave controller to receive a driving speed of the vehicle from the third slave controller through the second network between the first slave controller and the third slave controller; and if it is determined that the driving speed of the vehicle is equal to or less than a preset speed, controlling a high voltage power source to be shut off.

The method may further include if it is determined that a fault has occurred in the second network between the second slave controller and the first slave controller, determining whether the fault has been removed in the second network between the second slave controller and the first slave controller; and if it is determined that the fault has been removed in the second network between the second slave controller and the first slave controller, controlling the second slave controller to transmit information to and receive information from the first slave controller through the second network.

The first slave controller is configured to provide power according to a control from the master controller, and the third slave controller is configured to control a motor of the vehicle, and wherein the method may further include: if it is determined that a fault has occurred in the second network between the second slave controller and the first slave controller, determining whether a fault has occurred in the second network between the first slave controller and the third slave controller; and if it is determined that a fault has occurred in the second network between the first slave controller and the third slave controller, controlling the first slave controller shut off any one of power generated in an engine-generator and electrical power output from a battery.

The method may further include if it is determined that a fault has occurred in the second network between the first slave controller and the third slave controller, and a fault has not occurred in the first network between the first slave controller and the master controller, controlling the first slave controller to transmit information to the master controller through the first network in order to indicate to stop the vehicle.

The method may further include if it is determined that a fault has occurred in the second network between the first slave controller and the third slave controller, determining if the fault has been removed in the second network between the first slave controller and the third slave controller; and if it is determined that the fault has been removed in the second network between the first slave controller and the third slave controller, controlling the first slave controller to transmit information to and receive information from the third slave controller through the second network.

The method may further include if it is determined that a fault has occurred in the second network between the first slave controller and the third slave controller, determining how long the fault lasts in the second network between the first slave controller and the third slave controller, if it is determined that the fault lasts for a predetermined time in the second network between the first slave controller and the third slave controller, controlling the first slave controller to shut off one of electrical power generated from an engine-generator and electrical power output from the battery.

According to an aspect of an exemplary embodiment, there is provided a system for controlling vehicle driving, which may include: a first network through which a master controller is connected with a plurality of slave controllers; and a second network through which the plurality of slave controllers are connected one another, wherein the master controller is configured to determine whether a fault has occurred in the first network between the master controller and a first slave controller, and, if it is determined that a fault has occurred in the first network between the master controller and the first slave controller, the master controller may be configured to transmit information, which is directed to the first slave controller, to a second slave controller through the first network between the master controller and the second slave controller, and the second slave controller is configured to transmit the information received from the master controller to the first slave controller through a second network.

If it is determined that the fault has occurred in the first network between the master controller and the first slave controller, the first slave controller may be configured to transmit information, which is directed to the master controller, to the second slave controller through the second network, and the second slave controller is configured to transmit the information received from the first slave controller to the master controller through the first network between the second slave controller and the master controller.

BRIEF DESCRIPTION OF THE DRAWINGS

The above and/or other aspects will become apparent and more readily appreciated from the following description of exemplary embodiments, taken in conjunction with the accompanying drawings in which.

DETAILED DESCRIPTION

As the main inventive concepts allow for various changes and numerous exemplary embodiments, particular exemplary embodiments will be illustrated in the drawings and described in detail in the written description. However, this is not intended to limit the inventive concepts to particular modes of practice, and it is to be appreciated that all changes, equivalents, and substitutes that do not depart from the spirit and technical scope of the present inventive concept are encompassed in the exemplary embodiments. In the description of the exemplary embodiments, certain detailed explanations of related art are omitted when it is deemed that they may unnecessarily obscure the essence of the inventive concept.

While such terms as "first," "second," etc., may be used to describe various components, such components must not be limited to the above terms. The above terms are used only to distinguish one component from another.

The terms used hereinbelow are merely used to describe particular exemplary embodiments, and are not intended to limit the inventive concept. An expression used in the singular encompasses the expression of the plural, unless it has a clearly different meaning in the context. It is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

The present inventive concepts may be described in terms of functional block components and various processing steps. Such functional blocks may be realized by any number of hardware and/or software components configured to perform the specified functions. For example, the exemplary embodiments may employ various integrated circuit components, e.g., memory elements, processing elements, logic elements, look-up tables, and the like, which may carry out a variety of functions under the control of one or more microprocessors or other control devices. Similarly, where the elements of the exemplary embodiments are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the exemplary embodiments could employ any number of conventional techniques for electronics configuration, signal processing and/or control, data processing and the like. The words "mechanism" and "element" are used broadly and are not limited to mechanical or physical exemplary embodiments, but can include software routines in conjunction with processors, etc.

Exemplary embodiments will be described below in more detail with reference to the accompanying drawings. Those components that are the same or are in correspondence are rendered the same reference numeral regardless of the figure number, and redundant explanations are omitted. As used herein, the term "and/or" includes any and all combinations of one or more of the associated listed items.

Figure 1:
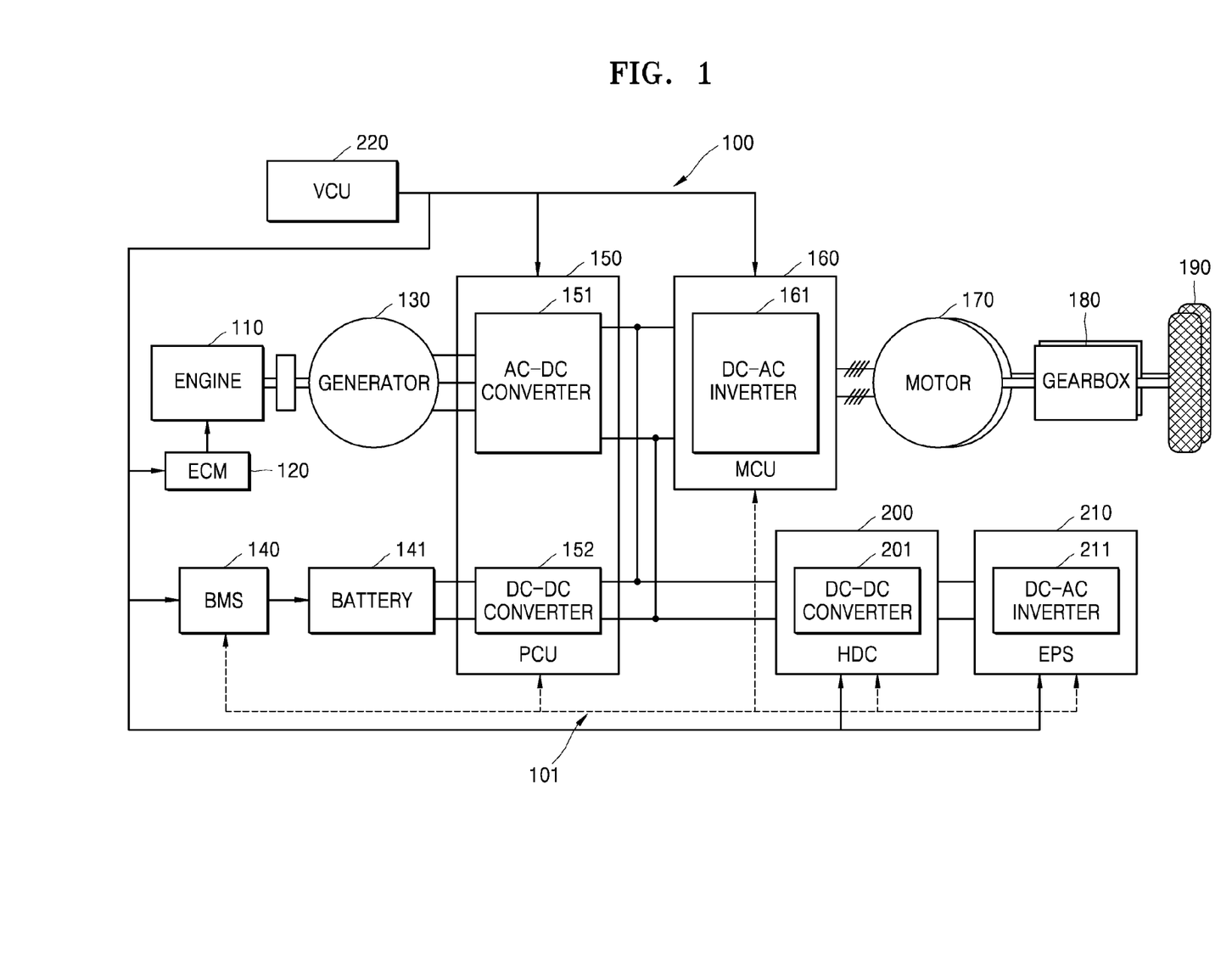
FIG. 1 is a block diagram showing the structure of an apparatus for controlling vehicle driving according to an exemplary embodiment.

FIG. 1 is a block diagram showing the structure of an apparatus for controlling vehicle driving according to an exemplary embodiment.

Referring to FIG. 1, the apparatus for controlling vehicle driving includes an engine 110, an engine control module 120 (hereinafter referred to as "ECM"), a generator 130, a battery management system 140 (hereinafter referred to as "BMS), a battery 141, a power control unit 150 (hereinafter referred to as "PCU") including an AC-DC converter 151 and a DC-DC converter 152, a motor control unit 160 (hereinafter referred to as "MCU") including a DC-AC inverter 161, a motor 170, a gearbox 180, wheels 190, a high voltage DC-DC step down converter 200 (hereinafter referred to as "HDC") including a DC-DC converter 201, an electric power steering 210 (hereinafter referred to as "EPS") including a DC-AC inverter 211, and a vehicle control unit (VCU) 220.

The engine 110 generates mechanical energy for rotation of the generator 130 from fuel such as gasoline or diesel.

The ECM 120 is an electronic control device controlling major operations inside the engine 110 and manages operations and states of major sensors and actuators.

The generator 130 is mechanically connected to the engine 110 and converts rotational energy from the engine 110 into electrical energy. The generator 130 may be formed with a permanent magnet-type synchronized motor for high output density and/or high efficiency.

The BMS 140 measures voltage, current and/or temperature of the battery 141 to diagnose the states of the battery 141 and provide protections for the battery 141. In particular, the BMS 140 estimates the state of current of the battery 141 and controls and manages the battery 141 accordingly.

The battery 141 is a device for storing energy and performs a voltage source role converting chemical energy into electrical energy or electrical energy into chemical energy. The battery 141 may be implemented with a variety of types of battery cells. For example, the battery 141 may be a nickel-cadmium battery, a lead storage battery, a nickel metal hybrid battery (NiMH), a lithium ion battery, or a lithium polymer battery.

According to an exemplary embodiment, the vehicle is operated by efficiently driving using two power sources: a first power source which obtains a driving force from the engine 110 and the generator 130; and a second power source which obtains a driving force from the BMS 140 and the battery 141.

The PCU 150 is a power conversion device which converts the first power source obtained from the engine 110 and the generator 130 and the second power source obtained from the BMS 140 and the battery 141, and provides electric power to the MCU 160 and the motor 170. The PCU 150 includes the AC-DC converter 151 and the DC-DC converter 152. The AC-DC converter 151 converts electrical energy (alternating current voltage), which is generated in the generator 130, into electrical energy in an arbitrary form, that is, a direct current voltage, in particular. The DC-DC converter 152 raises or lowers an arbitrary direct current voltage generated from the battery 141, into a predetermined direct current voltage. According to an exemplary embodiment, when the vehicle accelerates, the DC-DC converter 152 transfers direct voltage from the battery 141 to the motor 170 through the MCU 160, and when the vehicle slows down, the DC-DC converter 152 stores electrical energy recovered through the motor 170 and the MCU 160 or energy from the engine 110 and the generator 130, in the battery 141 for charging.

The MCU 160 is a control device for controlling the motor 170 of the vehicle, and includes a DC-AC inverter 161 for controlling the motor 170. The MCU 160 controls the motor 170 with a torque or speed instructed from the VCU 220 through a Controller Area Network (hereinafter referred to as "CAN") communication protocol. The MCU generates alternating voltage from direct voltage obtained from the PCU 150, and transfers the alternating voltage to the motor 170.

The motor 170 receives the alternating voltage from the MCU 160, converts the voltage into a mechanical rotational power, and drives the wheels 190.

The gearbox 180 is a device for deceleration, which receives a torque of the motor 170 and converts the received torque into a high torque according to a designed gear ratio.

The HDC 200 is a power conversion device formed with the DC-DC converter 201 for converting the voltage of the high voltage DC bus of the vehicle into a predetermined direct low-voltage. According to the exemplary embodiment, the HDC 200 provides power to a compressor (not shown) for generating compressed air and the EPS 210. Together with the PCU 150, the HDC 200 generates major direct voltage and/or power for the vehicle.

The EPS 210 is an electronic steering device, and with the motor 170 and the gearbox 180, the EPS 210 replaces a hydraulic steering device which is complicated and takes a large space in the existing vehicles. The EPS 210 includes the DC-AC inverter 211. The DC-AC inverter 211 converts a direct voltage received from the HDC 200 into an alternating voltage to be used in steering.

The VCU 220 receives inputs of driver's acceleration and/or deceleration pedal information and steering wheel angle information, and generates driving commands for power, driving, steering and/or cooling devices. The VCU 220 performs a role of an upper-level controller for vehicle driving and additionally performs a role for stably managing the vehicle by receiving warning signals from major devices of the vehicle system. The VCU 220 is connected to major controllers inside the vehicle through a CAN communication protocol.

According to the exemplary embodiment, the VCU 220 is an upper-level controller and functions as a master controller, and the BMS 140, the PCU 150, the MCU 160, and the EPS 210 are lower-level controllers and may function as slave controllers.

Figure 2:
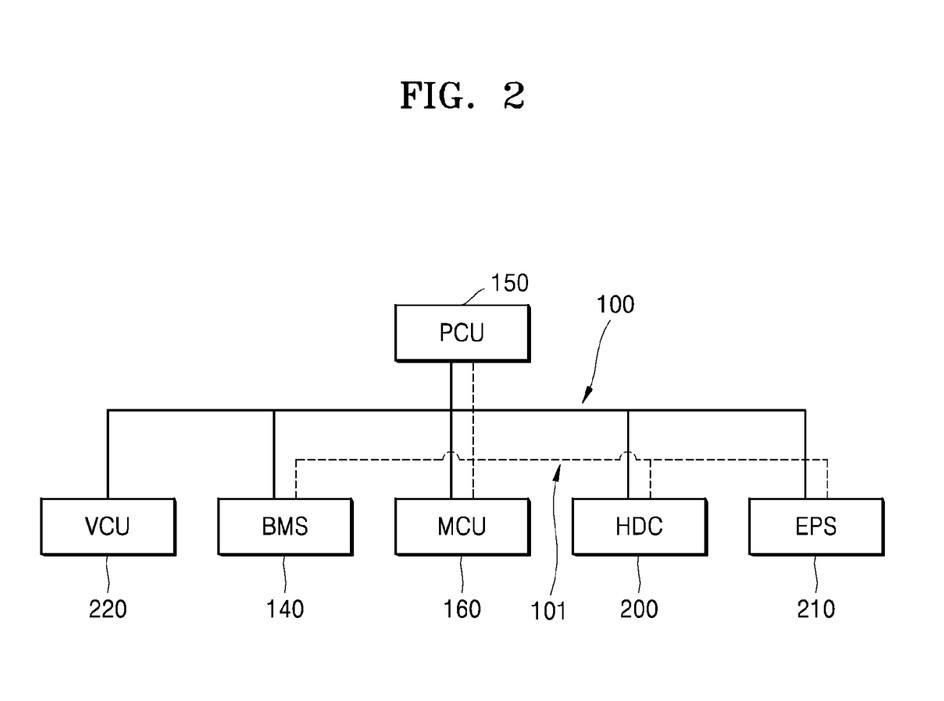
FIG. 2 is a block diagram showing the structure of a communication network between a master controller and slave controllers according to an exemplary embodiment.

FIG. 2 is a block diagram showing the structure of a communication network between a master controller and a plurality of slave controllers according to an exemplary embodiment.

In particular, the VCU 220 as a master controller transmits information to and receives information from the BMS 140, the PCU 150, the MCU 160, the HDC 200 and the EPS 210, as slave controllers, through a first communication network 100. Also, the BMS 140, the PCU 150, the MCU 160, the HDC 200, and the EPS 210, as slave controllers, communicate information through a second communication network 101 amongst one another.

Here, the first communication network 100 may use a communication network using a main CAN bus or a main CAN communication network and the second communication network 101 or a sub CAN communication network may use a communication network using a sub CAN bus. However, the exemplary embodiment is not limited thereto and any communication protocol transmitting data or commands using a bus line may be applied.

Through the main CAN communication network, the VCU 220 as a master controller may transmit information to and receive information from the BMS 140, the PCU 150, the MCU 160, the HDC 200, and the EPS 210, as slave controllers. Through the sub CAN communication network, the VCU 220 may transmit the BMS 140, the PCU 150, the MCU 160, the HDC 200, and the EPS 210, as slave controllers, may communicate information for driving the vehicle such as information on power supply, driving, steering, and/or cooling of the vehicle amongst one another.

Figure 3:
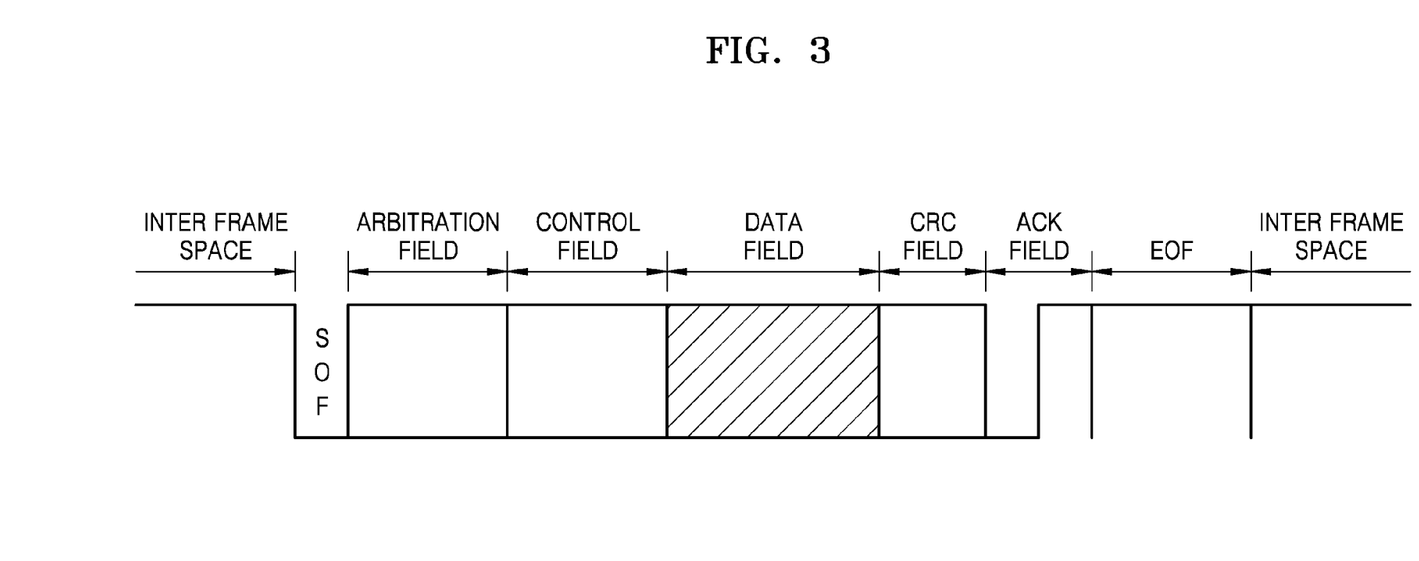
FIG. 3 is a diagram showing the structure of a frame of a controller area network (CAN) protocol according to an exemplary embodiment.

FIG. 3 is a diagram showing the structure of a frame of a controller area network (CAN) protocol. The CAN protocol has recently been applied to a variety of industrial fields in addition to the automobile industry. The CAN is a multi-master message type serial network communication method defined as an ISO 11898 specification speed as generally known in the field.

Referring to FIG. 3, a start of a message frame is indicated by 'SOF (start of frame)'. Here, 'SOF' comes first in a message frame and has a value of '0' which is a dominant bit, as a default value.

An 'arbitration field' of the message frame has an identification (ID) bit and a remote transmission request (RTR) bit. Here, the RTR bit indicates whether the message frame is a data frame or a remote frame. When a current message frame is a data frame for transmitting data, the RTR bit has a value of '0'. Meanwhile, when the current message frame is a remote frame for requesting data transmission, the RTR bit has a value of '1' which is a recessive bit.

A 'control field' of the message frame has six (6) bits. Among the six (6) bits, two (2) bits are designated for a reserved area, and the other four (4) bits are designated for a data length code area denoting the number of bytes of a data field.

A 'data field' of the message frame includes data to be transmitted in a data frame. The size of the 'data field' is 0 to 8 bytes, and each byte includes 8 bits. Here, in transmitting data, a most significant bit (MSB) 0 is transmitted first in each byte.

A 'cyclic redundancy check (CRC) field' of the message frame indicates a cyclic redundancy check code. The 'CRC field' has a 'CRC sequence' and a 'CRC delimiter' which has a value of '1'.

An 'ACK field' of the message frame has 2 bits, including an 'ACK slot' and an 'ACK delimiter'. The 'ACK slot' which is the first bit has a value of '0' and the 'ACK delimiter' which is the second bit has a value of '1'. However, the 'ACK slot' may be recorded as a value of '1' transmitted from another node that successfully receives a message.

An 'end of frame (EOF)' of the message frame has seven (7) bits each having a value of '1' and indicates that the message frame is finished.

An 'interframe space' of the message frame includes an 'intermission' and a 'bus idle' and distinguishes a current message frame from a previous or a next message frame.

Based on the details described above with reference to FIGS. 1 through 3, an operation of a method for controlling vehicle driving according to an exemplary embodiment shown in FIGS. 4 through 7 will now be explained.

Figure 4:
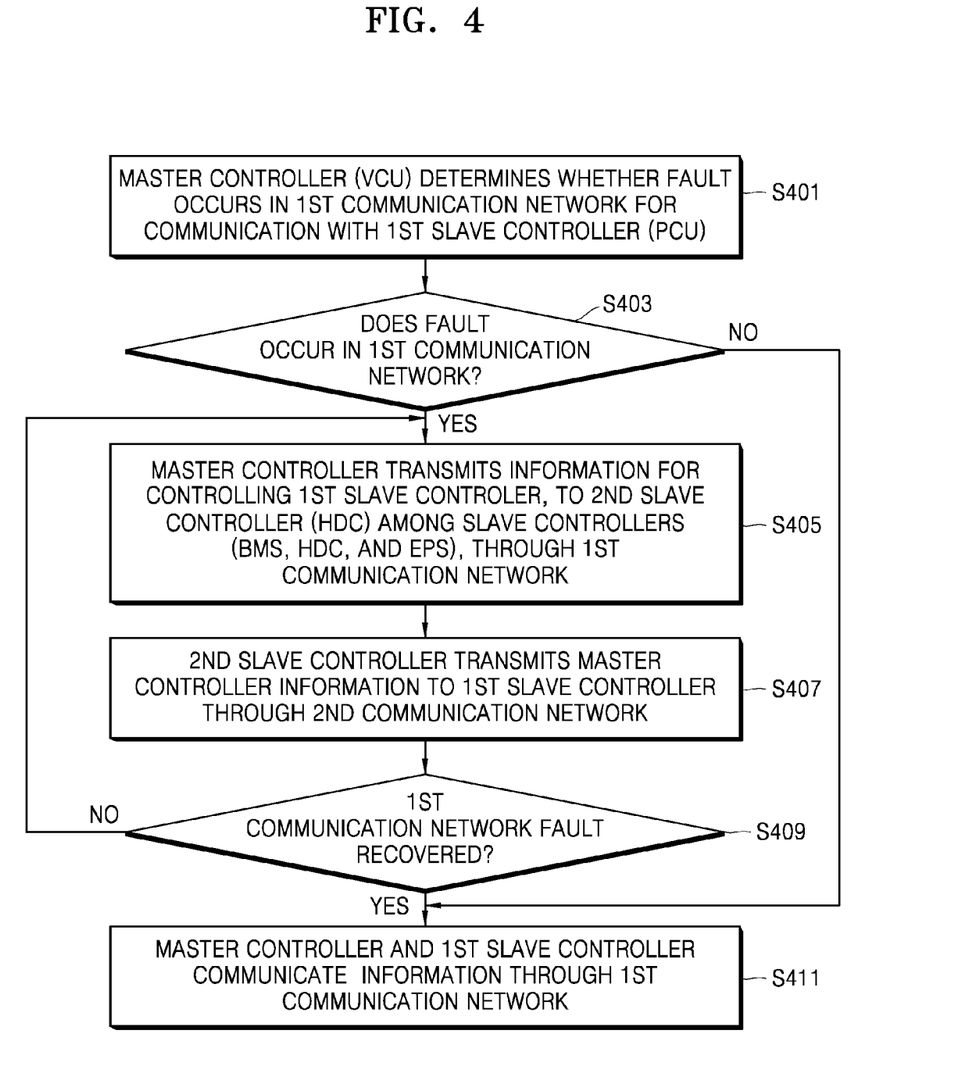
FIGS. 4 through 7 are flowcharts showing an operation of a method for controlling vehicle driving according to an exemplary embodiment.

First, referring to FIG. 4, the VCU 220 as a master controller determines whether or not a fault occurs in a first communication network 100 (a main CAN communication network) for communicating with the PCU 150 as a first slave controller in operation S401. Here, the first communication network fault may indicate a case, for example, when a first slave controller cannot receive information from a master controller because of an unstable communication state when there is, for example, a car accident or a short circuit of a major high voltage power supply line occurs, and thus the ground voltage of the vehicle becomes unstable.

When a fault occurs in the first communication network 100 in operation S403, the master controller transmits control information for controlling the first slave controller, to a second slave controller (for example, the HDC 190) among the slave controllers (the BMS 140, the HDC 190 and the EPS 200), through the first communication network 100 in operation S405. Here, the second slave controller is not limited to the HDC 190 and may be any one of the BMS 140, the HDC 190 and the EPS 200. Here, the master controller may generate a display signal in an instrument panel (not shown) of the vehicle or an audio signal in order to output a warning signal indicating that a first communication network error occurs to notify a driver of the vehicle.

The second slave controller transmits the information from the master controller to the first slave controller through the second communication network 101 (a sub CAN communication network) in operation S407. Here, when a first communication network fault occurs, the first slave controller receives from the second slave controller through the second communication network 101, information indicating the driving state of the vehicle and the intention of the driver, such as information on the state of driving modes (Parking (P), Driving (D), Neutral (N), and Reverse (R)) and a high voltage power supply shut off command (key-off), among commands of the master controller, and the first slave controller provides electric power. That is, when a first communication network fault occurs, the first slave controller switches to a power supply mode by itself, and provides power to other slave controllers regardless of controls of the master controller.

Then, the master controller periodically determines whether or not the first communication network fault is recovered in operation S409. When the first communication network fault is recovered, the master controller transmits information to and receives information from the first slave controller through the first communication network 100 in operation S411. However, when the first communication network fault is not recovered, the master controller continues to transmit control information for controlling the first slave controller, to the second slave controller (for example, the HDC 190) among the slave controllers (the BMS 140, the HDC 190 and the EPS 200), through the first communication network 100 in operation S405

Figure 5:
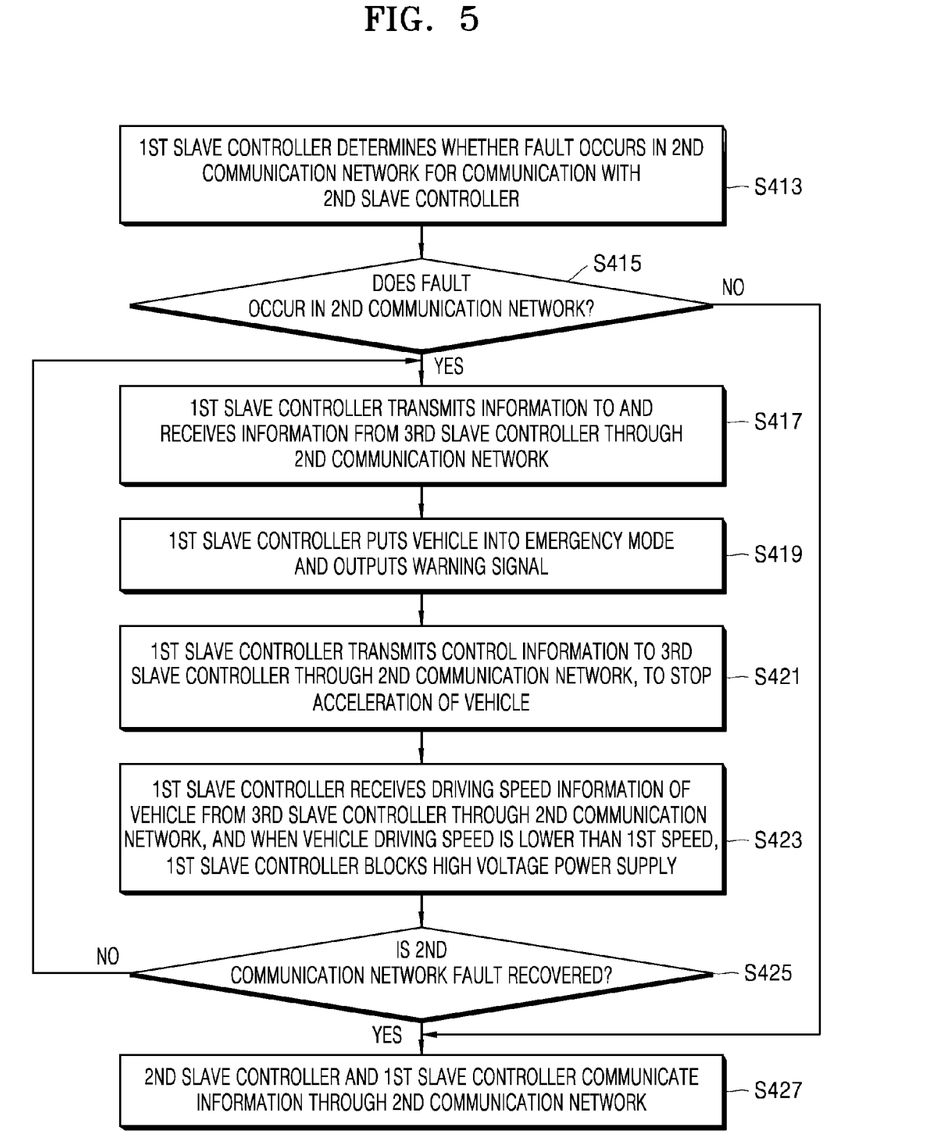

In addition, referring to FIG. 5, when the first communication network fault is not recovered, the first slave controller determines whether or not a fault occurs in a second communication network 101 between the first slave controller and the second slave controller in operation S413. Here, the second communication network fault may indicate a case, for example, when transmitting information between the first slave controller and the second slave controller is impossible.

When a fault occurs in the second communication network 101 between the first slave controller and the second slave controller, the first slave controller transmits information to and receives information from the MCU 160 as a third slave controller through a second communication network 101 in operation S417.

Then, the first slave controller puts the vehicle into an emergency mode and outputs a display signal on an instrument panel (not shown) of the vehicle or an audio signal. By doing so, the first slave controller outputs a warning signal indicating that the first slave controller (or the vehicle) is in a communication breakdown or a fault occurs in the controller in operation S419.

Then, the first slave controller transmits 0 torque information to the third slave controller through the second communication network 101 so that the vehicle is not accelerated any more in operation S421.

Then, the first slave controller receives the driving speed of the vehicle from the third slave controller through the second communication network 101, and when the driving speed of the vehicle is equal to or less than a preset speed, for example, 5 km/h, the first slave controller enters a sequence for shutting off the high voltage power supply of the vehicle and stably shuts off the high voltage power supply in operation S423.

Then, the first slave controller periodically determines whether or not the fault in the second communication network 101 for communicating with the second slave controller is recovered in operation S425. When the second communication network fault is recovered, the first slave controller transmits information to and receives information from the second slave controller through the second communication network 101 in operation S427. However, when the second communication network fault is not recovered, the first slave controller continues to transmit information to and receive information from the MCU 160 as the third slave controller through a second communication network 101.

Figure 6:
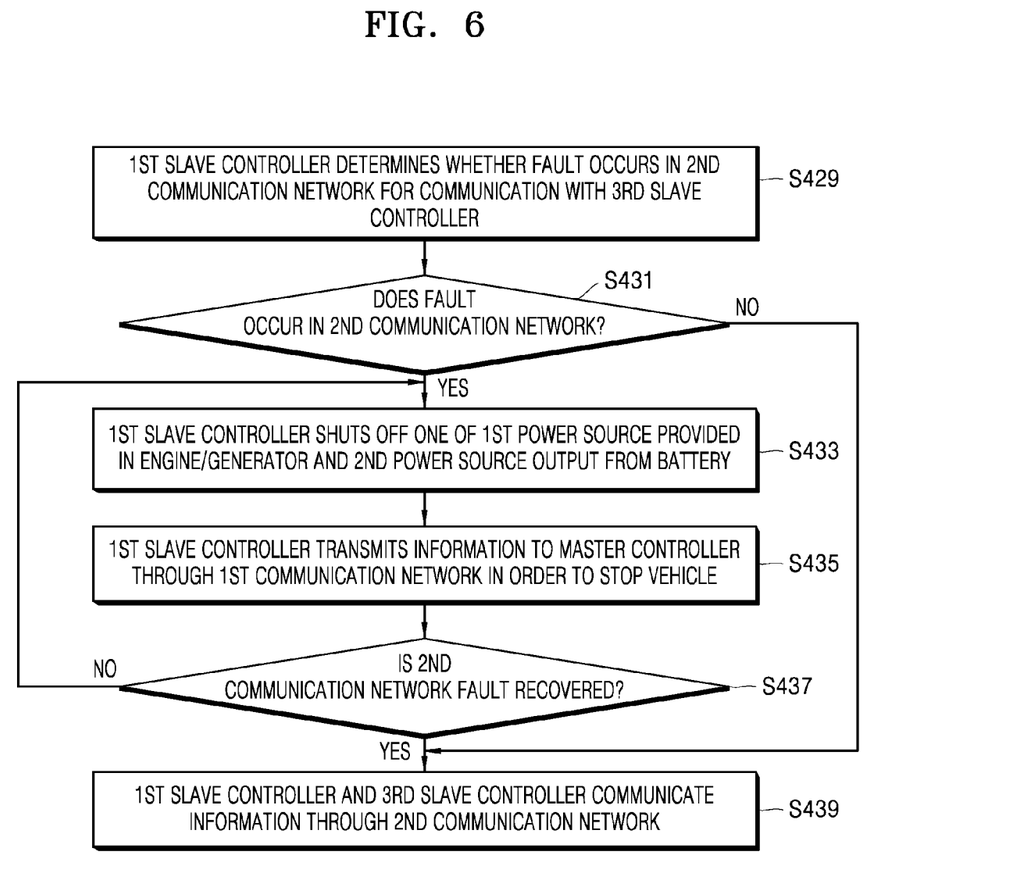

In addition, referring to FIG. 6, when the fault in the second communication network 101 between the first slave controller and the second slave controller is not recovered, the first slave controller determines whether or not a fault occurs in the second communication 101 network between the first slave controller and the third slave controller in operation S429. Here, the second communication network fault may indicate, for example, a case when transmitting information between the first slave controller and the third slave controller is impossible.

When a fault occurs in the second communication network 101 between the first slave controller and the third slave controller in operation S431, the first slave controller shuts off any one of a first power source (electrical power) generated from the engine 110 and/or the generator 220 and a second power source (electrical power) output from the battery 141 in operation S433. For example, the first slave controller may shut off the first power source (electrical power) generated from the engine 110 and/or the generator 220.

Then, the first slave controller transmits information to the master controller through the first communication network 100 in order to indicate that the first slave controller will stop the vehicle in operation S435. Here, the first communication network fault indicates a case where the first slave controller cannot receive information from the master controller, and therefore it is possible for the first slave controller transmits information to the master controller.

Then, the first slave controller periodically determines whether or not the fault in the second communication network 101 for communicating between the first slave controller and the third slave controller is recovered in operation S437. When the second communication network fault is recovered, the first slave controller transmits information to and receives information from the third slave controller through the second communication network 101 in operation S439.

Figure 7:
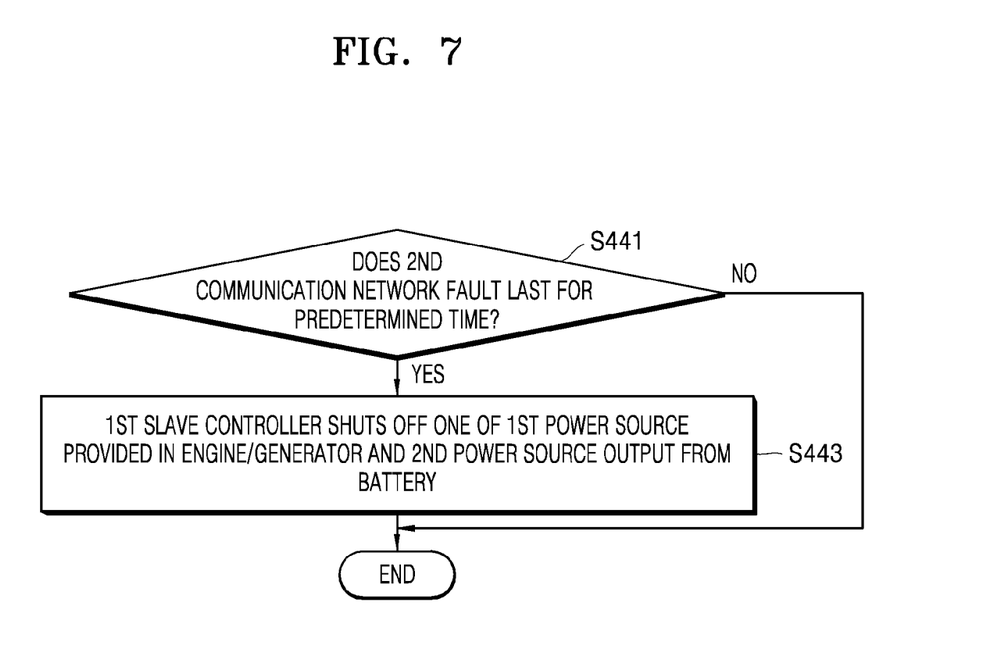

In addition, referring to FIG. 7, when the fault in the second communication network between the first slave controller and the third slave controller is not received, the first slave controller determines whether or not the fault in the second communication network 101 for communicating with the third slave controller lasts for a predetermined time in operation S441. When the fault in the second communication network 101 for communication between the first slave controller and the third slave controller lasts for a predetermined time, the first slave controller shuts off the remaining one of the first power source (electrical power) generated from the engine 110 and/or the generator 220 and the second power source (electrical power) output from the battery 141 in operation S443. For example, the first slave controller may shut off the second power source (electrical power) output from the battery 141.

As described above, according to the one or more of the above exemplary embodiments, stable continuation of vehicle driving is enabled even when a communication fault occurs. Also, when a communication fault occurs, a vehicle is stably stopped and power supply is shut off and thus safety of the driver can be secured.

In addition, different exemplary embodiments can also be implemented through computer readable code/instructions in/on a medium, e.g., a computer readable medium, to control at least one processing element to implement any above described embodiment. The medium can correspond to any medium/media permitting the storage and/or transmission of the computer readable code.

The computer readable code may be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as Internet transmission media. Thus, the medium may be such a defined and measurable structure including or carrying a signal or information, such as a device carrying a bit stream according to one or more exemplary embodiments. The media may also be a distributed network, so that the computer readable code is stored/transferred and executed in a distributed fashion. Also, functional programs, codes, and code segments for accomplishing the inventive concept can be easily construed by programmers skilled in the art to which the exemplary embodiments pertain.

It should be understood that the exemplary embodiments described therein should be considered in a descriptive sense only and not for purposes of limitation. Descriptions of features or aspects within each exemplary embodiment should typically be considered as available for other similar features or aspects in other exemplary embodiments.

While exemplary embodiments have been particularly shown and descried above, it will be understood by those of ordinary skill in the art that various changes in form and details may be made therein without departing from the spirit and scope of the inventive concept as defined by the following claims.

What is claimed is:

1. A method for controlling vehicle driving, comprising:
    determining whether a fault has occurred in a first network between a master controller and a first slave controller; and
    when it is determined that a fault has occurred in the first network between the master controller and the first slave controller, controlling the master controller to transmit information, which is directed to the first slave controller, to a second slave controller through the first network between the master controller and the second slave controller, and controlling the second slave controller to transmit the information received from the master controller to the first slave controller through a second network,
    wherein the first slave controller is configured to provide power according to a control from the master controller, and
    wherein the method further comprises:
    when it is determined that a fault has occurred in the first network between the master controller and the first slave controller, controlling the first slave controller to switch to a power supply mode and provide the power to the second slave controller regardless of the control of the master controller.

2. The method of claim 1, further comprising:
    when it is determined that the fault has occurred in the first network between the master controller and the first slave controller, controlling the first slave controller to transmit information, which is directed to the master controller, to the second slave controller through the second network and controlling the second slave controller to transmit the information received from the first slave controller to the master controller through the first network between the second slave controller and the master controller.

3. The method of claim 1, wherein the master controller is configured to transmit information to and receive information from each of the slave controllers through the first network.

4. The method of claim 1, wherein each of the slave controllers is configured to transmit information to and receive information from another slave controller of the slave controllers through the second network.

5. The method of claim 1, further comprising outputting a warning signal indicating that a fault has occurred in the first network when it is determined that a fault has occurred in the first network between the master controller and the first slave controller.

6. The method of claim 1, further comprising:
    when it is determined that a fault has occurred in the first network between the master controller and the first slave controller, determining whether the fault has been removed in the first network between the master controller and the first slave controller; and
    when it is determined that the fault has been removed in the first network between the master controller and the first slave controller, controlling the master controller to transmit information to and receive information from the first slave controller through the first network.

7. The method of claim 1, wherein when the first slave controller does not receive information that is transmitted from the master controller, it is determined that the fault has occurred in the first network.

8. A method for controlling vehicle driving, comprising:
    determining whether a fault has occurred in a first network between a master controller and a first slave controller; and
    when it is determined that a fault has occurred in the first network between the master controller and the first slave controller, controlling the master controller to transmit information, which is directed to the first slave controller, to a second slave controller through the first network between the master controller and the second slave controller, and controlling the second slave controller to transmit the information received from the master controller to the first slave controller through a second network, wherein the method further comprising comprises:

when it is determined that a fault has occurred in the first network between the master controller and the first slave controller, determining whether a fault has occurred in the second network between the second slave controller and the first slave controller; and when it is determined that a fault has occurred in the second network between the second slave controller and the first slave controller, controlling the third slave controller to receive the information from the master controller and transmit the information received from the master controller to the first slave controller through the second network between the third slave controller and the first slave controller.

9. The method of claim 8, wherein the first slave controller is configured to provide power according to a control from the master controller, and the third slave controller is configured to control a motor of the vehicle, and wherein the method further comprises:

controlling the first slave controller to transmit information to stop acceleration of the vehicle, to the third slave controller through the second network between the first slave controller and the third slave controller.

10. The method of claim 8, wherein the first slave controller is configured to provide power according to a control from the master controller, and the third slave controller is configured to control a motor of the vehicle, and wherein the method further comprises:

controlling the first slave controller to receive a driving speed of the vehicle from the third slave controller through the second network between the first slave controller and the third slave controller; and when it is determined that the driving speed of the vehicle is equal to or less than a preset speed, controlling a high voltage power source to be shut off.

11. The method of claim 8, further comprising:

when it is determined that a fault has occurred in the second network between the second slave controller and the first slave controller, determining whether the fault has been removed in the second network between the second slave controller and the first slave controller; and when it is determined that the fault has been removed in the second network between the second slave controller and the first slave controller, controlling the second slave controller to transmit information to and receive information from the first slave controller through the second network.

12. The method of claim 8, wherein the first slave controller is configured to provide power according to a control from the master controller, and the third slave controller is configured to control a motor of the vehicle, and wherein the method further comprises:

when it is determined that a fault has occurred in the second network between the second slave controller and the first slave controller, determining whether a fault has occurred in the second network between the first slave controller and the third slave controller; and when it is determined that a fault has occurred in the second network between the first slave controller and the third slave controller, controlling the first slave controller shut off any one of power generated in an engine-generator and electrical power output from a battery.

13. The method of claim 12, further comprising, when it is determined that a fault has occurred in the second network between the first slave controller and the third slave controller, and a fault has not occurred in the first network between the first slave controller and the master controller, controlling the first slave controller to transmit information to the master controller through the first network in order to indicate to stop the vehicle.

14. The method of claim 12, further comprising:

when it is determined that a fault has occurred in the second network between the first slave controller and the third slave controller, determining that the fault has been removed in the second network between the first slave controller and the third slave controller; and when it is determined that the fault has been removed in the second network between the first slave controller and the third slave controller, controlling the first slave controller to transmit information to and receive information from the third slave controller through the second network.

15. The method of claim 12, further comprising:

when it is determined that a fault has occurred in the second network between the first slave controller and the third slave controller, determining how long the fault lasts in the second network between the first slave controller and the third slave controller, when it is determined that the fault lasts for a predetermined time in the second network between the first slave controller and the third slave controller, controlling the first slave controller to shut off one of electrical power generated from an engine-generator and electrical power output from the battery.

16. A non-transitory computer readable recording medium having recorded thereon a computer program for implementing:

determining whether a fault has occurred in a first network between a master controller and a first slave controller; and when it is determined that a fault has occurred in the first network between the master controller and the first slave controller, controlling the master controller to transmit information, which is directed to the first slave controller, to a second slave controller through the first network between the master controller and the second slave controller, and controlling the second slave controller to transmit the information received from the master controller to the first slave controller through a second network, wherein the first slave controller is configured to provide power according to a control from the master controller, and wherein the method further comprises:

when it is determined that the fault has occurred in the first network between the master controller and the first slave controller, controlling the first slave controller to switch to a power supply mode and provide the power to the second slave controller regardless of the control of the master controller.

17. system for controlling vehicle driving, comprising:

a first network through which a master controller is connected with a plurality of slave controllers; and a second network through which the plurality of slave controllers are connected one another, wherein the master controller is configured to determine whether a fault has occurred in the first network between the master controller and a first slave controller, and, when it is determined that a fault has occurred in the first network between the master controller and the first slave controller, the master controller is configured to transmit information, which is directed to the first slave controller, to a second slave controller through the first network between the master controller and the second slave controller, and the second slave controller is configured to transmit the information received from the master controller to the first slave controller through a second network, wherein the first slave controller is configured to provide power according to a control from the master controller, and wherein when it is determined that the fault has occurred in the first network between the master controller and the first slave controller, the first slave controller is configured to switch to a power supply mode and provide the power to the second slave controller regardless of the control of the master controller.

18. The system of claim 17, wherein, when it is determined that the fault has occurred in the first network between the master controller and the first slave controller, the first slave controller is configured to transmit information, which is directed to the master controller, to the second slave controller through the second network, and the second slave controller is configured to transmit the information received from the first slave controller to the master controller through the first network between the second slave controller and the master controller.

* * * * *